US012590600B2

(12) United States Patent
Chen et al.

(10) Patent No.: US 12,590,600 B2
(45) Date of Patent: **\*Mar. 31, 2026**

(54) FURNITURE AND FURNITURE PART ASSEMBLY THEREOF

(71) Applicants: KING SLIDE WORKS CO., LTD., Kaohsiung City (TW); KING SLIDE TECHNOLOGY CO., LTD., Kaohsiung City (TW)

(72) Inventors: Ken-Ching Chen, Kaohsiung City (TW); Fang-Cheng Su, Kaohsiung City (TW); Yue-Hua Tang, Kaohsiung City (TW); Chun-Chiang Wang, Kaohsiung City (TW)

(73) Assignees: King Slide Works Co., Ltd., Kaohsiung City (TW); King Slide Technology Co., Ltd., Kaohsiung City (TW)

( \* ) Notice: Subject to any disclaimer, the term of this patent is extended or adjusted under 35 U.S.C. 154(b) by 697 days.

This patent is subject to a terminal disclaimer.

(21) Appl. No.: 18/059,690

(22) Filed: Nov. 29, 2022

(65) Prior Publication Data

US 2024/0003370 A1     Jan. 4, 2024

(30) Foreign Application Priority Data

Jul. 4, 2022     (TW) .................................. 111125245

(51) Int. Cl.
*F16B 12/34*          (2006.01)
*A47B 88/90*          (2017.01)

(52) U.S. Cl.
CPC ............ *F16B 12/34* (2013.01); *A47B 88/941* (2017.01); *A47B 2088/902* (2017.01)

(58) Field of Classification Search
CPC ........ F16B 12/34; F16B 12/38; A47B 88/925; A47B 2088/902
See application file for complete search history.

(56) References Cited

U.S. PATENT DOCUMENTS

| | | | | |
|---|---|---|---|---|
| 10,772,421 B2 * | 9/2020 | Kampl | ................... | A47B 88/46 |
| 10,772,422 B1 * | 9/2020 | Chen | ..................... | A47B 88/941 |
| 10,966,523 B2 * | 4/2021 | Kampl | ................... | F16B 12/14 |
| 11,122,895 B2 | 9/2021 | Kampl | | |
| 11,213,125 B2 * | 1/2022 | Irgang | ................. | A47B 88/944 |
| 12,022,944 B2 * | 7/2024 | Chen | ...................... | F16B 12/34 |
| 2011/0221318 A1 * | 9/2011 | Chen | ................... | A47B 88/941 |
| | | | | 312/263 |

(Continued)

FOREIGN PATENT DOCUMENTS

| | | |
|---|---|---|
| CN | 111870072 A | 11/2020 |
| GB | 2190832 A | 12/1987 |

(Continued)

*Primary Examiner* — Matthew R Mcmahon
(74) *Attorney, Agent, or Firm* — Rosenberg, Klein & Lee

(57) ABSTRACT

Provided is a furniture part assembly that includes a sidewall, a covering member, and a fitting. The sidewall is provided with a mounting feature. The covering member is detachably mounted on the mounting feature. The fitting is configured to be mounted to the mounting feature of the sidewall, and thus stacked on the sidewall, after the covering member is detached from the mounting feature. A piece of furniture having the furniture part assembly is also provided.

14 Claims, 18 Drawing Sheets

(56) References Cited

U.S. PATENT DOCUMENTS

| | | | | |
|---|---|---|---|---|
| 2012/0133259 A1* | 5/2012 | Babucke-Runte | ... | A47B 88/941 |
| | | | | 312/330.1 |
| 2019/0191877 A1 | 6/2019 | Poppendiek et al. | | |
| 2024/0000231 A1* | 1/2024 | Chen | ...................... | F16B 12/22 |

FOREIGN PATENT DOCUMENTS

| | | | | | |
|---|---|---|---|---|---|
| JP | 2020509308 A | 3/2020 | | | |
| JP | 2021506489 A | 2/2021 | | | |
| TW | 202017508 A | 5/2020 | | | |
| WO | WO-2014005164 A1 * | 1/2014 | ........... | A47B 88/941 |
| WO | 2018184061 A1 | 10/2018 | | | |
| WO | 2022006604 A1 | 1/2022 | | | |

* cited by examiner

FURNITURE AND FURNITURE PART ASSEMBLY THEREOF

FIELD OF THE INVENTION

The present invention relates to furniture. More particularly, the invention relates to a piece of furniture on which at least one fitting can be mounted according to user needs, and a resulting furniture part assembly of the furniture.

BACKGROUND OF THE INVENTION

China Patent No 11052001313 discloses a drawer wall and a wall element that can be mounted on the drawer wall. The drawer wall includes an opening and a covering member. The covering member doses the opening when at a closing 15 position and exposes the opening when at an opening position. A spring element is configured to interact with the covering member. The wall element has a hook configured to be mounted in the opening of the drawer wall and thereby move the covering member against the elastic force of the spring element from the closing position, at which the opening is closed, to the opening, position, at which the opening is exposed. One technical feature of the drawer wall in this patent is that the covering member stays in the drawer wall regardless of its working position.

To satisfy different user needs, however, it is not always desired to put two furniture pans together in the way described above. It is therefore important to develop a product different from that disclosed in the afore-cited patent.

SUMMARY OF THE INVENTION

The present invention relates to a piece of furniture on which at least one fitting can be mounted according to user needs, and a resulting furniture part assembly of the furniture.

According to one aspect of the present invention, a furniture part assembly includes a sidewall, a covering member, and a fitting. The sidewall includes a bottom portion and a top portion. The top portion has a first predetermined height with respect to the bottom portion, and the top portion is provided with a mounting feature. The covering member is detachably mounted on the mounting feature. The fitting includes a bottom portion and a top portion. The bottom portion of the fitting is configured to be mounted to the mounting feature of the sidewall after the coveting member is detached from the mounting feature, in order for the fitting to be stacked on the sidewall, and for the top portion of the fitting to have a second predetermined height with respect to the bottom portion of the sidewall, wherein the second predetermined height is greater than the first predetermined height.

Preferably, the mounting feature is an aperture, and the bottom portion of the fitting is provided with a first mounting portion and a second mounting portion that are configured to the mounted on a first inner wall and a second inner wall of the aperture respectively.

Preferably, the first mounting portion has an engaging hook, and the engaging hook is configured to be hooked to the first inner wall.

Preferably, there is a gap between the first mounting portion and the second mounting portion.

Preferably, the fitting has a front portion, and the first mounting portion and the second mounting portion are located adjacent to the front portion of the fitting.

Preferably, the fitting has a rear portion, a first supporting feature is provided adjacent to the rear portion of the fitting, and the sidewall is provided with a second supporting feature configured to support, and be supported by, the first supporting feature.

Preferably, the furniture part assembly further includes a first panel, one of the first panel and the front portion of the fitting is provided with a first connecting feature, and the other of the first panel and the front portion of the fitting is provided with a second connecting feature for connecting with the first connecting feature.

Preferably, the first connecting feature includes a head portion and an extension portion connected to the head portion, and the second connecting feature includes an entrance opening and a receiving room in communication with the entrance opening. The head portion is configured to enter the receiving room through the entrance opening, engage with a predetermined wall in the receiving room, and thereby connect the fitting and the first panel in a detachable manner.

Preferably, the furniture pan assembly further includes a second panel, the second panel is provided with a first engaging structure, and a second engaging structure is provided adjacent to the rear portion of the fitting and is configured to engage with the first engaging structure and thereby connect the fitting and the second panel in a detachable manner.

Preferably, one of the second panel and the fitting is provided with an engaging portion, and the other of the second panel and the fitting is provided with a release portion configured to connect with the engaging portion in a releasable manner.

According to another aspect of the present invention, a furniture part assembly includes a sidewall, a covering member, and a fitting. The sidewall is provided with a mounting feature. The fitting is detachably mounted to the mounting feature and hence located on the sidewall. The covering member is configured to be detachably mounted on, and thereby cover, the mounting feature of the sidewall after the fitting is detached from the mounting feature.

Preferably, the mounting, feature is an aperture, and the fitting is provided with a mounting portion. When not yet detached from the mounting feature of the sidewall, the fitting is mounted to the aperture via the mounting portion.

Preferably, the mounting portion has an engaging hook, and the engaging hook is configured to be hooked to an inner wall of the aperture.

Preferably, the fitting has a front portion, and the mounting portion is located adjacent to the front portion of the fitting.

Preferably, the fitting has a rear portion, a first supporting feature is provided adjacent to the rear portion of the fitting, and the sidewall is provided with a second supporting feature configured to support, and be supported by, the first supporting feature.

According to still another aspect of the present invention, a piece of furniture includes a bottom panel, a first sidewall, a second sidewall, a first panel, and a second panel. The first sidewall and the second sidewall are located on a left side and a right side of the bottom panel respectively. The first panel and the second panel are located on a front side and a rear side of the bottom panel respectively. One of the first sidewall and the second sidewall is provided with a mounting feature. A covering member is detachably mounted on the mounting feature. The one of the first sidewall and the second sidewall is configured to be mounted with a fitting via the mounting feature after the covering member is detached from the mounting feature, in order for the fitting to be stacked on the one of the first sidewall and the second sidewall.

Preferably, the mounting feature is an aperture, the fitting is provided with a first mounting portion and a second mounting portion that are configured to be mounted on a first inner wall and a second inner wall of the aperture respectively, the first mounting portion has an engaging hook, and the engaging hook is configured to be hooked to the first inner wall.

Preferably, the fitting has a front portion, one of the first panel and the front portion of the fitting is provided with a first connecting feature, and the other of the first panel and the front portion of the fitting is provided with a second connecting feature for connecting with the first connecting feature, Preferably, the first connecting feature includes a head portion and an extension portion connected to the head portion, the second connecting feature includes an entrance opening and a receiving room in communication with the entrance opening, and the head portion is configured to enter the receiving room through the entrance opening, engage with a predetermined wall in the receiving room, and thereby connect the fitting and the first panel in a detachable manner.

Preferably, the fitting has a rear portion, the second panel is provided with a first engaging structure, and a second engaging structure is provided adjacent to the rear portion of the fitting and is configured to engage with the first engaging structure and thereby connect the fitting and the second panel in a detachable manner.

Preferably, the second panel is further provided with an engaging portion, and the fitting is further provided with a release portion for connecting with the engaging portion in a releasable manner.

DETAILED DESCRIPTION OF THE INVENTION

Figure 1:
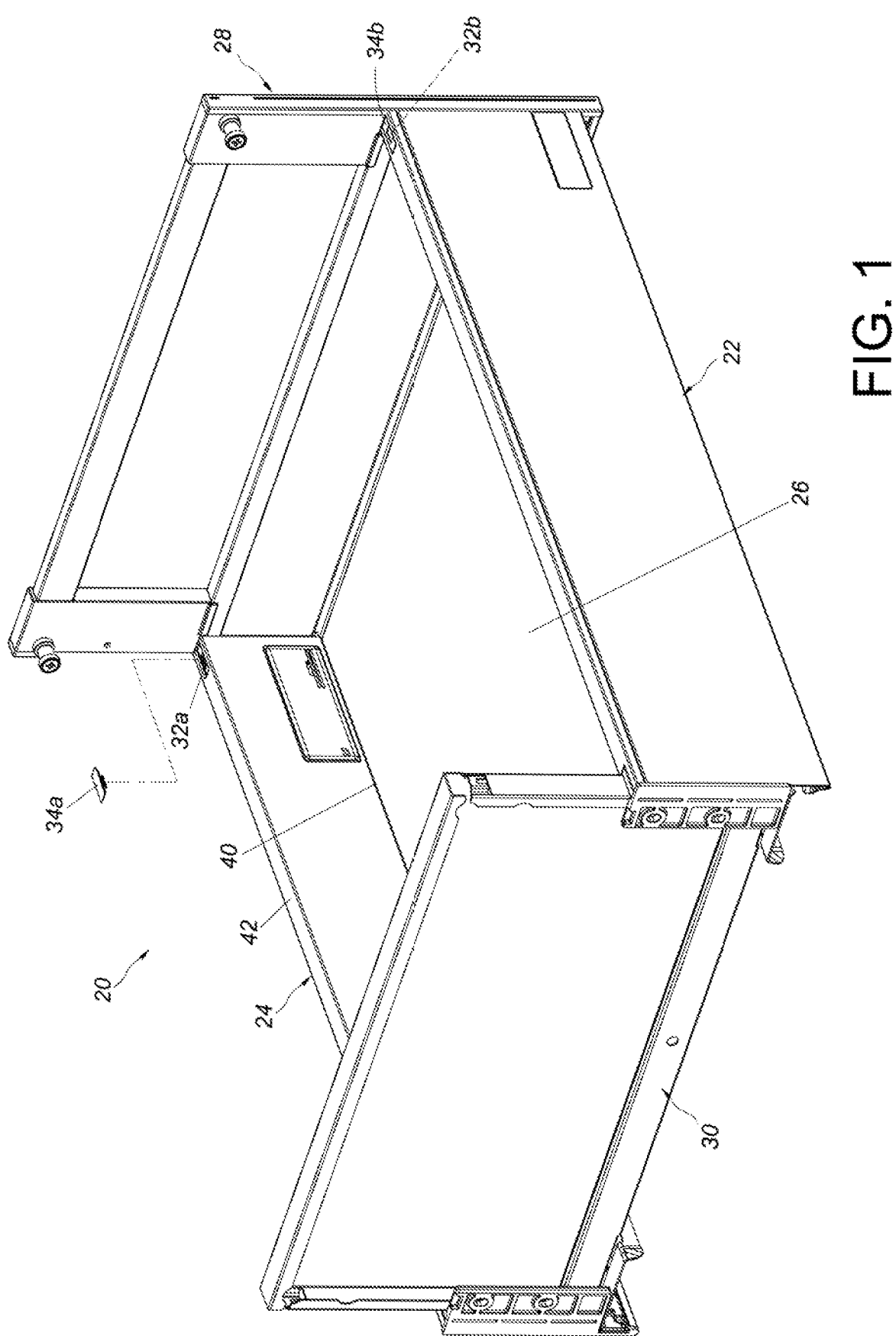
FIG. 1 is a perspective view of the furniture according to an embodiment of the present invention.

Referring to FIG. 1, the furniture 20 according to an embodiment of the present invention is, for example but not limited to, a drawer. The furniture 20 includes a first sidewall 22, a second sidewall 24, a bottom panel 26, a first panel 28, and a second panel 30.

The first sidewall 22 and the second sidewall 24 are located, for example, on the left and right sides of the bottom panel 26 respectively. The term "left and right sides" is used only to facilitate understanding of the relative positions of the sidewalls. That is to say, the left and right sides are interchangeable and are not intended to limit the actual positions of the sidewalls. The first panel 28 and the second panel 30 are located, for example, on the front and rear sides of the bottom panel 26 respectively. The first panel 28 is, for example, a front panel, and the second panel 30 is, for example, a rear panel (or back panel); the present invention, however, does not require the two panels to match the front and rear directions exactly as illustrated herein.

The first sidewall 22, the second sidewall 24, the bottom panel 26, the first panel 28, and the second panel 30 jointly define a receiving space for receiving an object.

The first sidewall 22 and the second sidewall 24 have substantially the same structural configuration. The second sidewall 24 is provided with a mounting feature 32a (which is, for example but not limited to, an aperture), and a covering member 34a is detachably mounted on the mounting feature 32a. The second sidewall 24 is configured to be mounted with a fitting by way of the mounting feature 32a after the covering member 34a is detached from the mounting feature 32a, Similarly, the first sidewall 22 is provided with another mounting feature 32b (which is, for example but not limited to, an aperture), and another covering member 34b is detachably mounted on the mounting feature 32b. The first sidewall 22 is configured to be mounted with another fitting by way of the mounting feature 32b after the covering member 34h is detached from the mounting, feature 32b. It should be pointed out that in FIG. 1 the covering member 34b of the first sidewall 22 has yet to be detached from the mounting feature 32*b*, and that if the covering member 34*a* of the second sidewall 24 in FIG. 1 were not detached from the mounting feature 32*a*, the covering member 34*a* would cover the mounting feature 32*a* (in the same way as the covering member 34*b* of the first sidewall 22 covers the mounting feature 32*b*, as shown in FIG. 1) and produce a dustproof effect.

Figure 2:
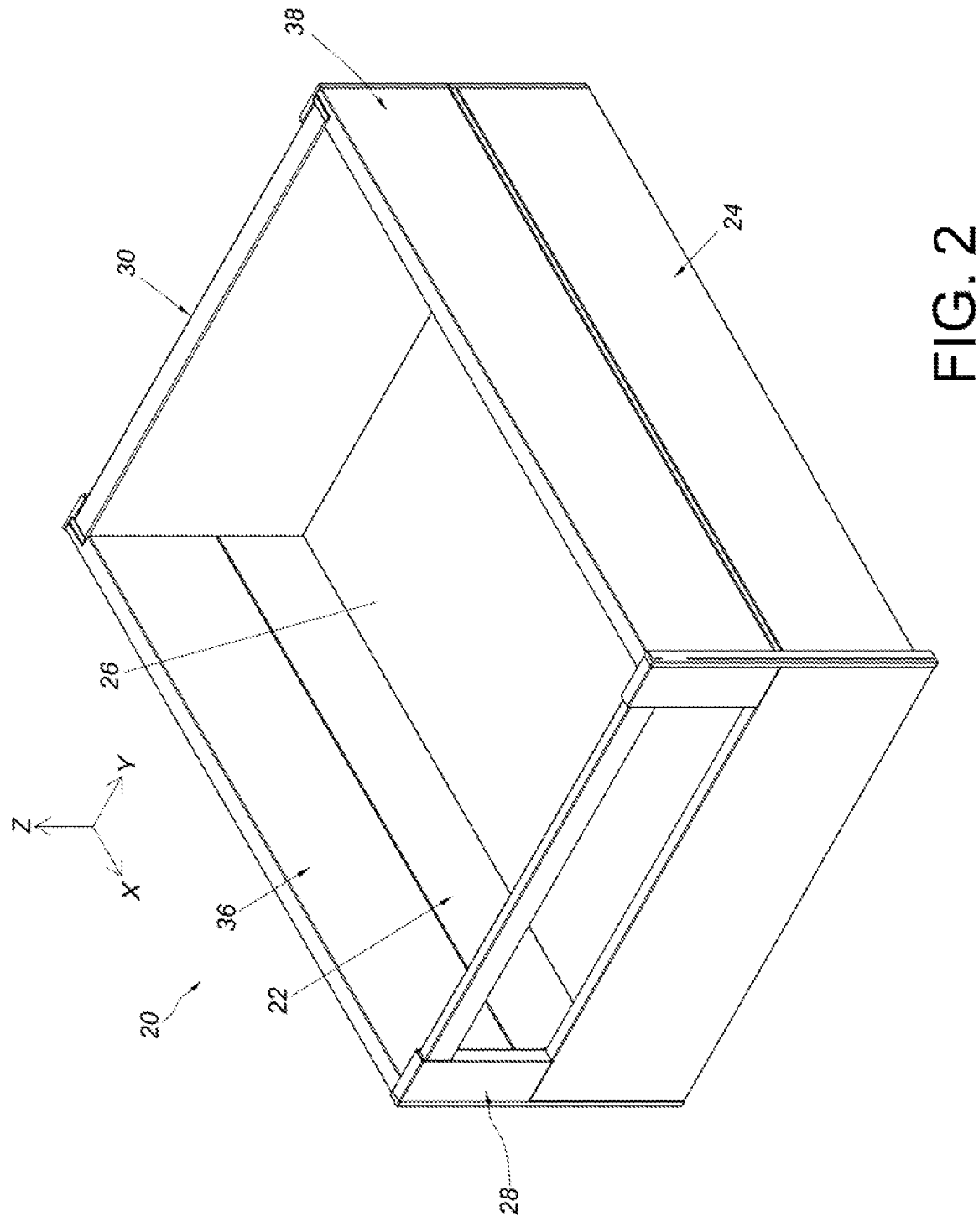
FIG. 2 is a perspective view showing that fittings can be used to add to the height of the furniture.

Referring to FIG. 2, the furniture 20 has a length direction X, a width direction Y, and a height direction Z, The length direction X, the width direction Y, and the height direction Z are perpendicular to one another. After the two covering members 34*a* and 34*b* are detached from the second sidewall 24 and the first sidewall 22 respectively, the first sidewall 22 and the second sidewall 24 can be mounted with a first fitting 36 and a second fitting 38 respectively, e.g., with the first fitting 36 and the second fitting 38 stacked on the first sidewall 22 and the second sidewall 24 respectively. Hence, depending on user needs, the first fitting 36 and the second fitting 38 can add to or increase the height of the two sidewalls 22 and 24 of the furniture 20 and it is feasible to make the increased height match the height of the first panel 28 and the second panel 30.

Figure 3:
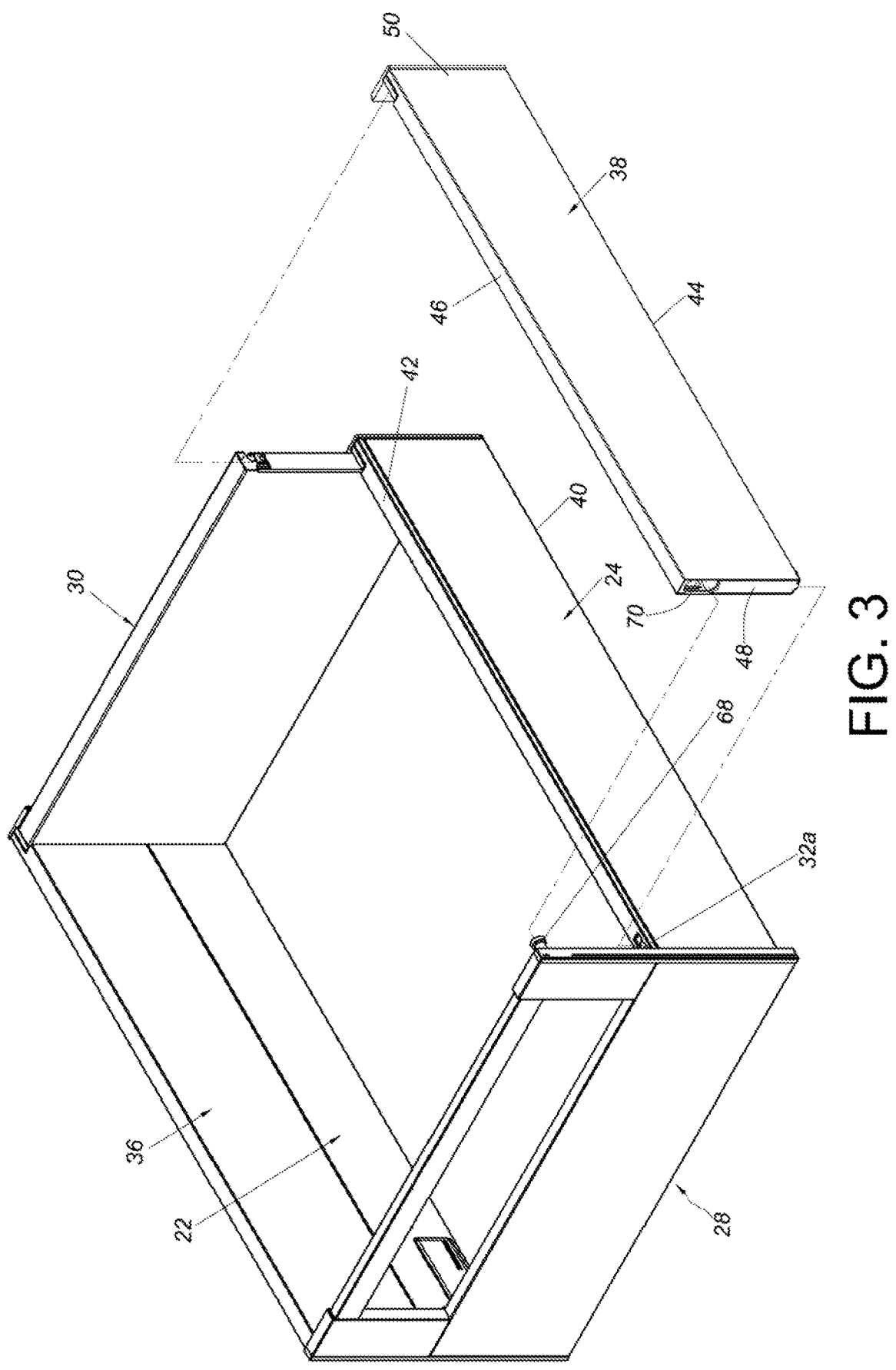
FIG. 3 is a partially exploded view that shows the furniture and first viewing angle.
Figure 4:
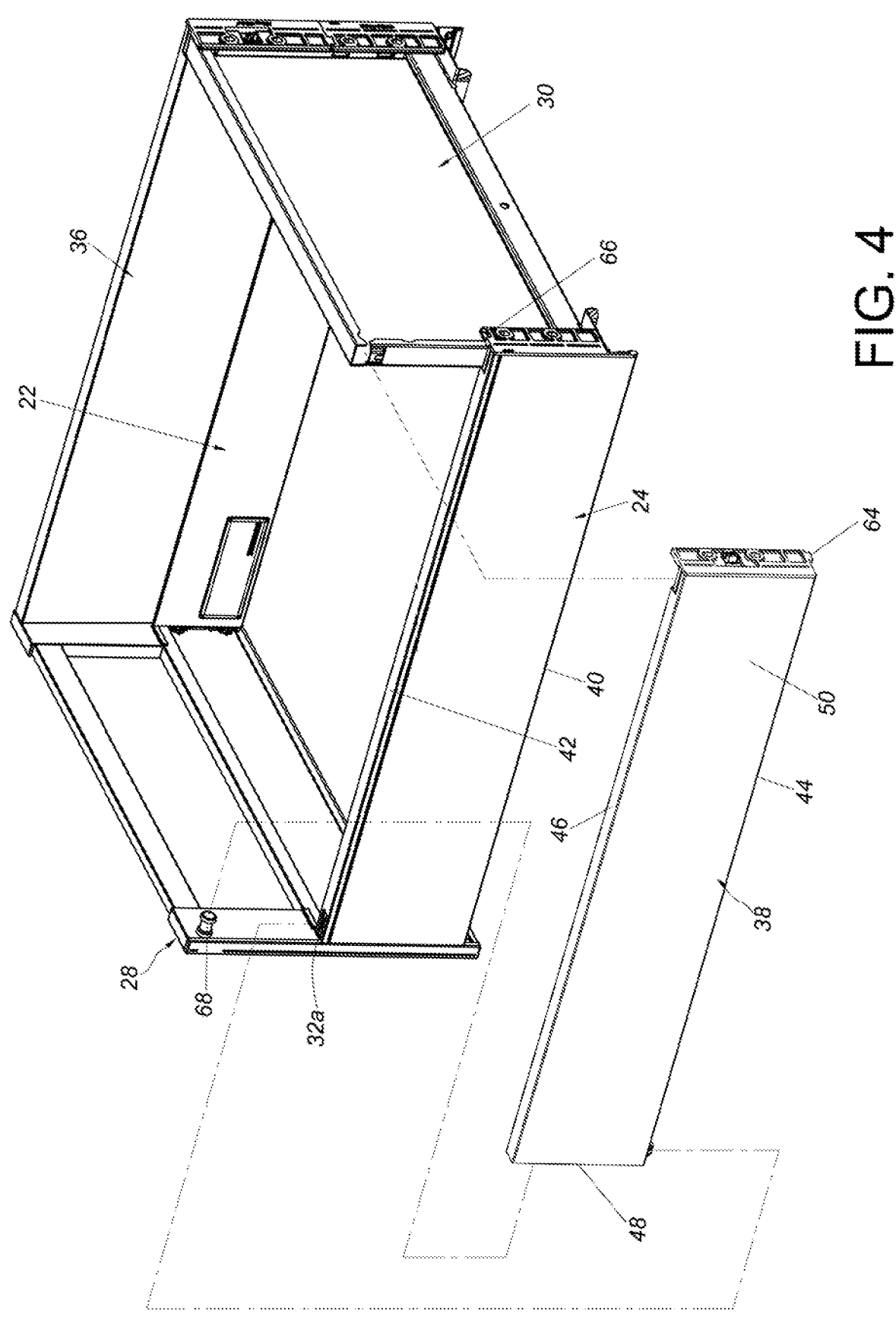
FIG. 4 is a partially exploded view that shows the furniture and the fittings from a second viewing angle.

Referring to FIG. 3 and FIG. 4, the second sidewall 24 (also referred to herein as the sidewall for short), the covering member 34*a*, and the second fitting 38 (also referred to herein as the fitting for short) constitute a furniture part assembly. Similarly, the first sidewall 22 (also referred to herein as the sidewall for short), the covering member 34*b*, and the first fitting. 36 (also referred to herein as the fitting for short) constitute another furniture part assembly.

One of the first sidewall 22 and the second sidewall 24 (e.g., the second sidewall 24) includes a bottom portion 40 and a top portion 42. The top portion 42 is provided with the mounting feature 32*a*, and the covering member 34*a* is detached from the mounting feature 32*a* of the second sidewall 24 so that the second fitting 38 can be mounted on the second sidewall 24. More specifically, the second fitting 38 includes a bottom portion 44 and a top portion 46, and the bottom portion 44 of the second fitting 38 is configured to be mounted to the mounting feature 32*a* of the second sidewall 24.

Preferably, the second fitting 38 has a front portion 48 and a rear portion 50. The front portion 48 of the second fitting 38 is configured to connect with the first panel 28, and the rear portion 50 of the second fitting 38 is configured to connect with, the second panel 30.

Figures 5, 5A:
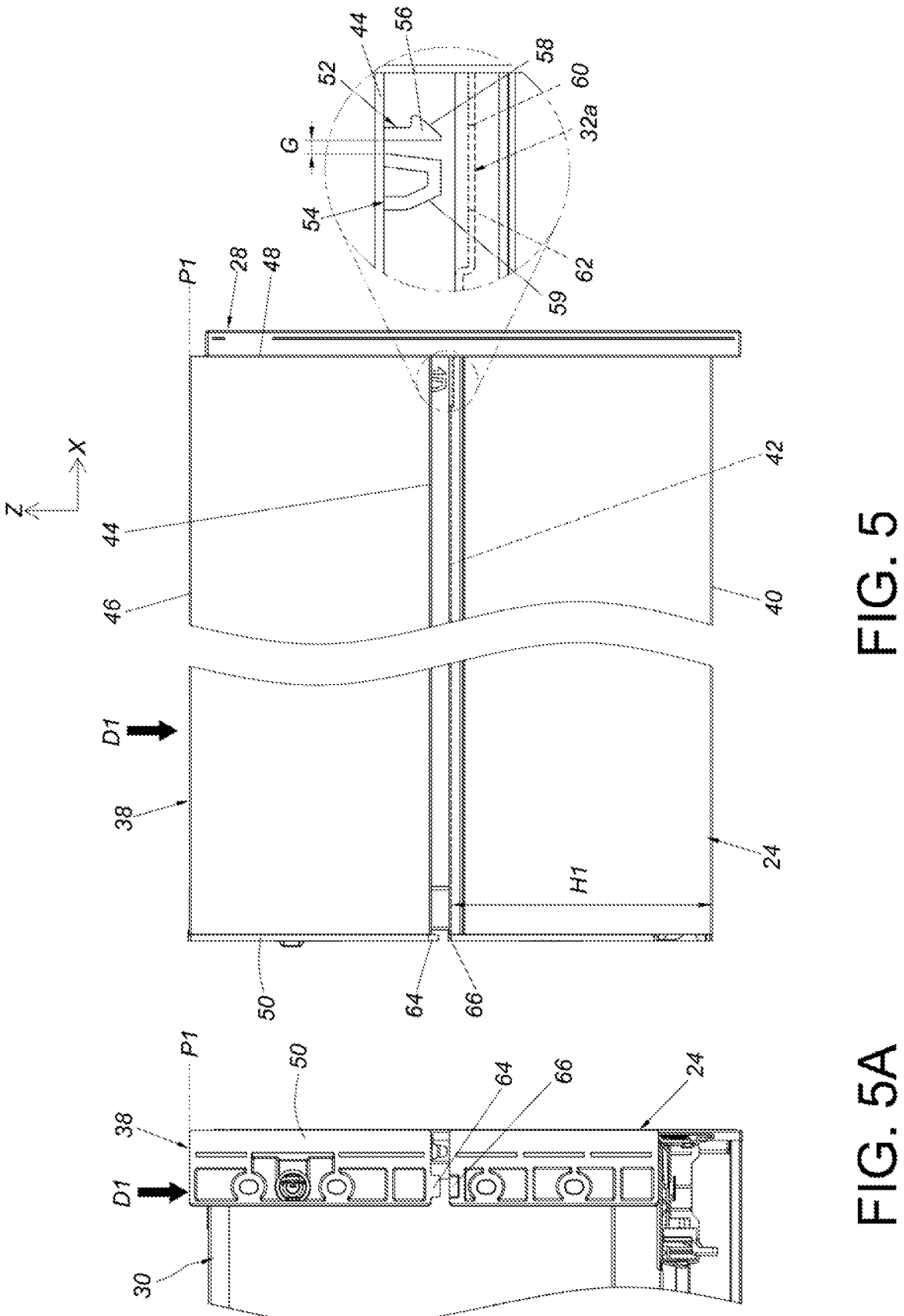
FIG. 5 is a side view showing the first step of mounting the fittings on the sidewalls of the furniture respectively.
FIG. 5A is a partial rear view showing the first step of mounting the fittings on the sidewalls of the furniture respectively.
Figure 6:
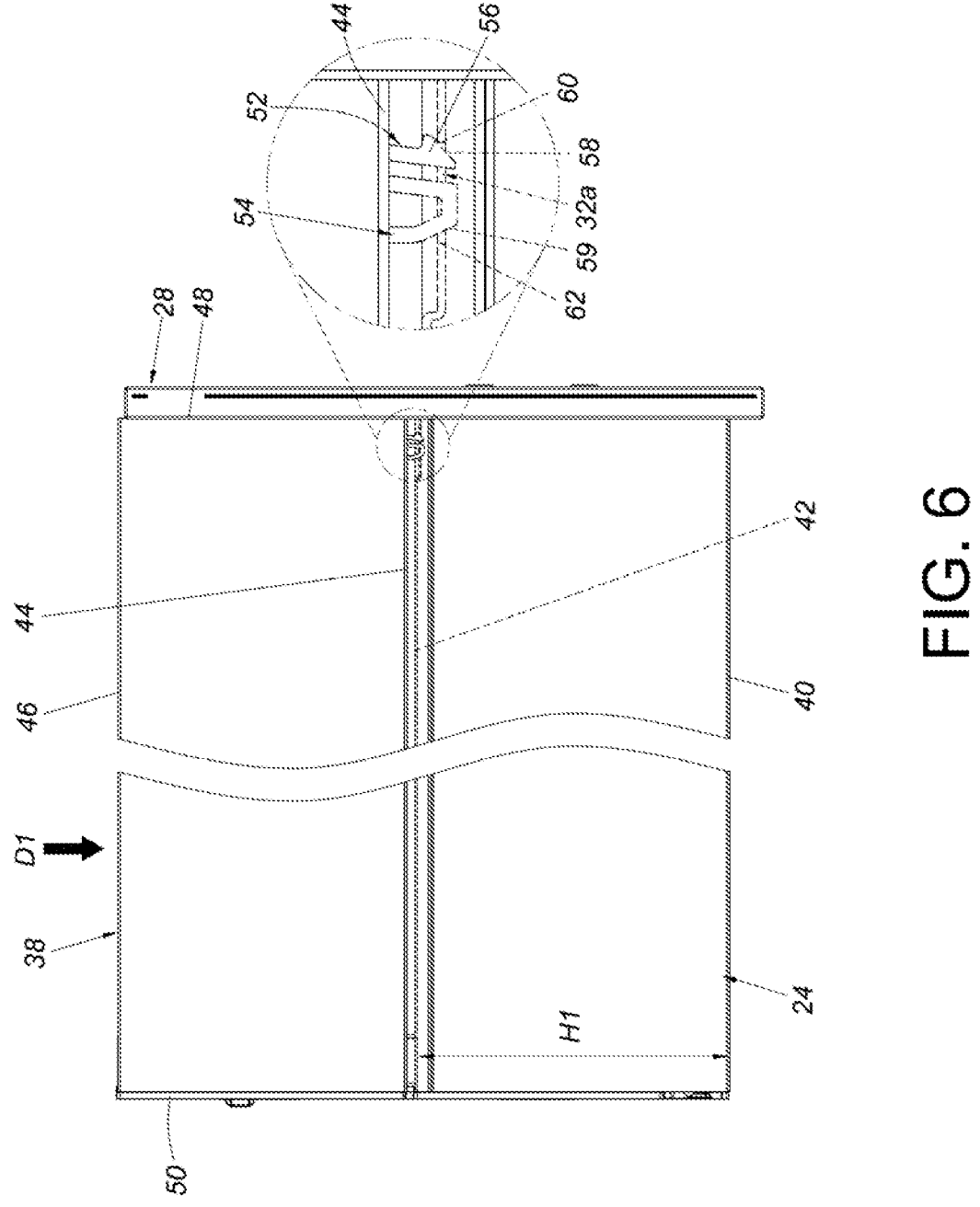
FIG. 6 is a side view showing the second step of mounting the fittings on the sidewalls of the furniture respectively.
Figures 7, 7A:
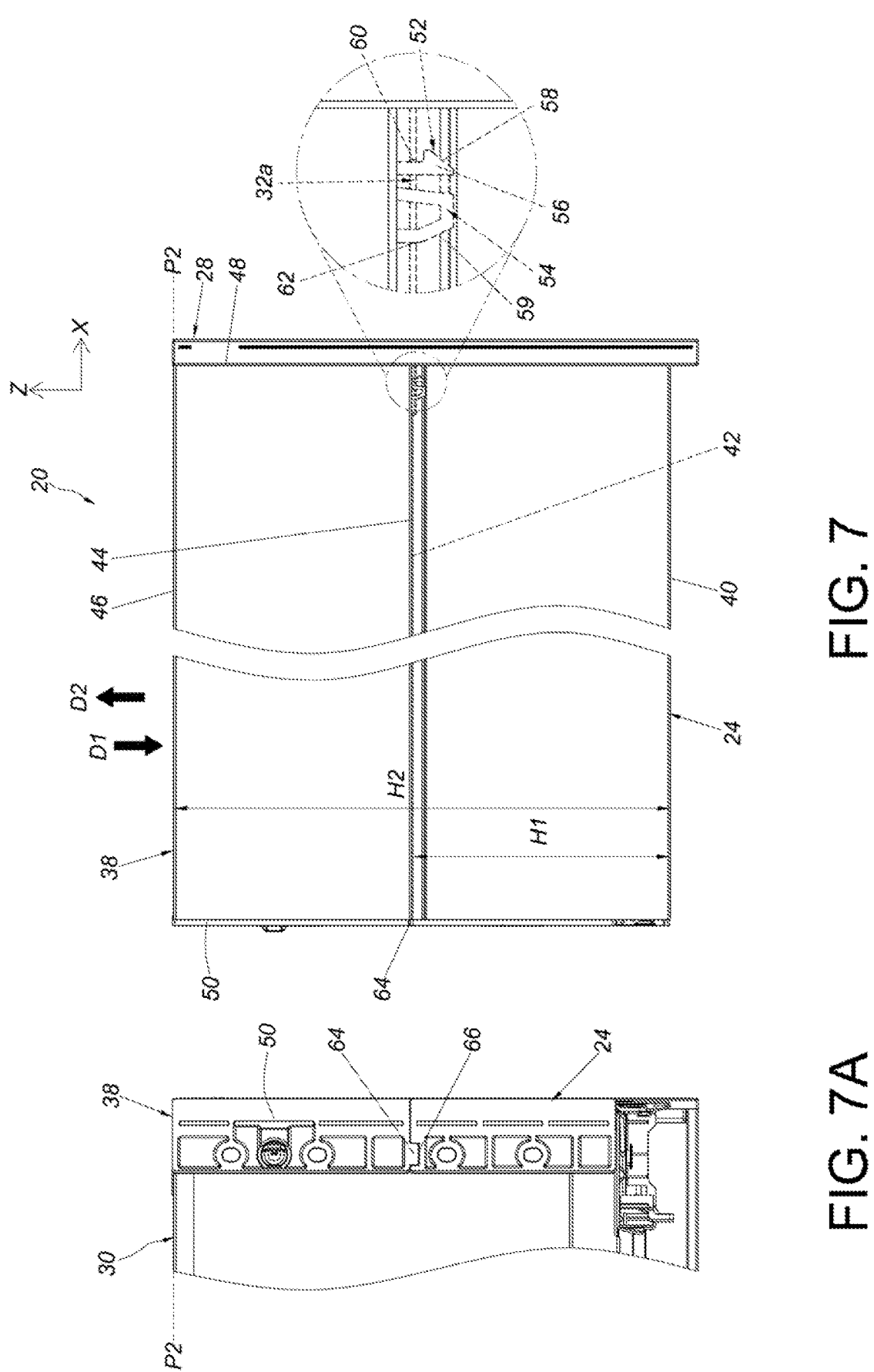
FIG. 7 is a side view showing the third step of mounting the fittings on the sidewalk of the furniture respectively.
FIG. 7A is a partial rear view showing the third step of mounting the fittings on the side wall; of the furniture respectively.

Referring to FIG. 5, FIG. 6, and FIG. 7, the top portion 42 of the second sidewall 24 has a first predetermined height 141 with respect to the bottom portion 40. Once the covering member 34*a* is detached from the mounting feature 32*a* of the second sidewall 24, the bottom portion 44 of the second fitting 38 can be mounted (e.g., detachably mounted) to the mounting feature 32*a* of the second sidewall 24 such that the second fitting 38 is located on the second sidewall 24, e.g., with the second fitting 38 stacked on the second sidewall 24 (see FIG. 7), and with the top portion 46 of the second fitting 38 having a second predetermined height 142 with respect to the bottom portion 40 of the second sidewall 24, wherein the second predetermined height 142 is greater than the first predetermined height 141 see FIG. 7).

Preferably, the second fitting 38 is provided with at least one mounting portion, such as a first mounting portion 52 and a second mounting portion 54, both arranged on the bottom portion 44 of the second fitting 38.

Preferably, the first mounting, portion 52 (also referred to herein as the mounting portion for short) has an engaging hook 56, and the engaging hook 56 has a guiding feature 58, wherein the guiding feature 58 is, for example but not limited to, an inclined surface or a cured surface. Similarly, the second mounting portion 54 has a guiding section 59, and the guiding section 59 is, for example but not limited to, an inclined surface or a curved surface.

Preferably, the first mounting portion 52 and the second mounting portion 54 are made of a flexible material such as but not limited to plastic.

Preferably, there is a gap Ci between the first mounting portion 52 and the second mounting portion 54 (see FIG. 5).

Preferably, the first mounting portion 52 and the second mount located adjacent to the front portion 48 of the second fitting 38.

The second fitting 38 is configured to be mounted on the second sidewall 24 in a first predetermined direction D1 from a first predetermined position P1 (see FIG. 5). During the mounting process, the first mounting portion 52 and the second mounting portion 54 on the bottom portion 44 of the second fitting 38 are aligned with the mounting feature 32*a* of the second sidewall 24. Once the guiding feature 58 of the first mounting portion 52 contacts a first inner wall 60 of the mounting feature 32*a* (the guiding section 59 of the second mounting portion 54 being configured to contact a second inner wall 62 of the mounting feature 32*a*) as shown in FIG. 6, the engaging hook 56 is easily guided into the mounting feature 32*a* (e.g., an aperture) of the second sidewall 24, and thanks to the gap G, the engaging hook 56 is turned by an angle and thus brought closer to the second mounting portion 54. The first mounting portion 52 in this state stores an elastic force (see FIG. 6).

When the second fitting 38 reaches a second predetermined position P2 (see FIG. 7 after being moved further in the first predetermined direction D1, the first mounting, portion 52 is moved away from the second mounting portion 54 in response to the release of the stored elastic force. Consequently, the first mounting portion 52 and the second mounting portion 54 are mounted on the first inner wall 60 and the second inner wall 62 of the mounting feature 32*a* of the second sidewall 24 respectively, thereby connecting the second fitting 38 and the second sidewall 24 in a detachable manner (see FIG. 7). It can be known from the above that, when not yet detached from the mounting feature 32*a* of the second sidewall 24, the second fitting 38 is mounted to the mounting feature 32*a* (e.g., an aperture) via the mounting, portion (e.g., the first mounting portion 52).

Preferably, the engaging hook. 56 of the first mounting portion 52 is configured to be hooked to the first inner wall 60 of the mounting feature 32*a* so as to prevent the second fitting 38 from separating from the second sidewall 24 in a second predetermined direction D2, which is the opposite direction of the first predetermined direction D1 (see. FIG. 7). For example, the engaging hook 56 can prevent the second fitting 38 and the second sideman 24 from separating from each other in the height direction Z of the furniture 20.

Preferably, the second mounting portion 54 is configured to press against the second inner, wall 62 to ensure a tight fit (see FIG. 7).

As shown in FIG. 5A and FIG. 7A, a first supporting feature 64 is provided adjacent to the rear portion 50 of the second fitting 38, and the second sidewall 24 is provided with a second supporting feature 66 (see FIG. 5A and FIG. 5), When the second fitting 38 reaches the second predetermined position P2 (see FIG. 7A and FIG. 7) alter being moved from the first predetermined position P1 (see FIG. 5A and FIG. 5) in the first predetermined direction D1, the second supporting feature 66 and the first supporting feature

64 are supported by each other to produce a positioning effect. One of the first supporting feature 64 and the second supporting feature 66 is a projection, and the other of the first supporting feature 64 and the second supporting feature 66 is a recess; in practice, however, the present invention has no limitation on the configurations of the two supporting features.

Figure 8:
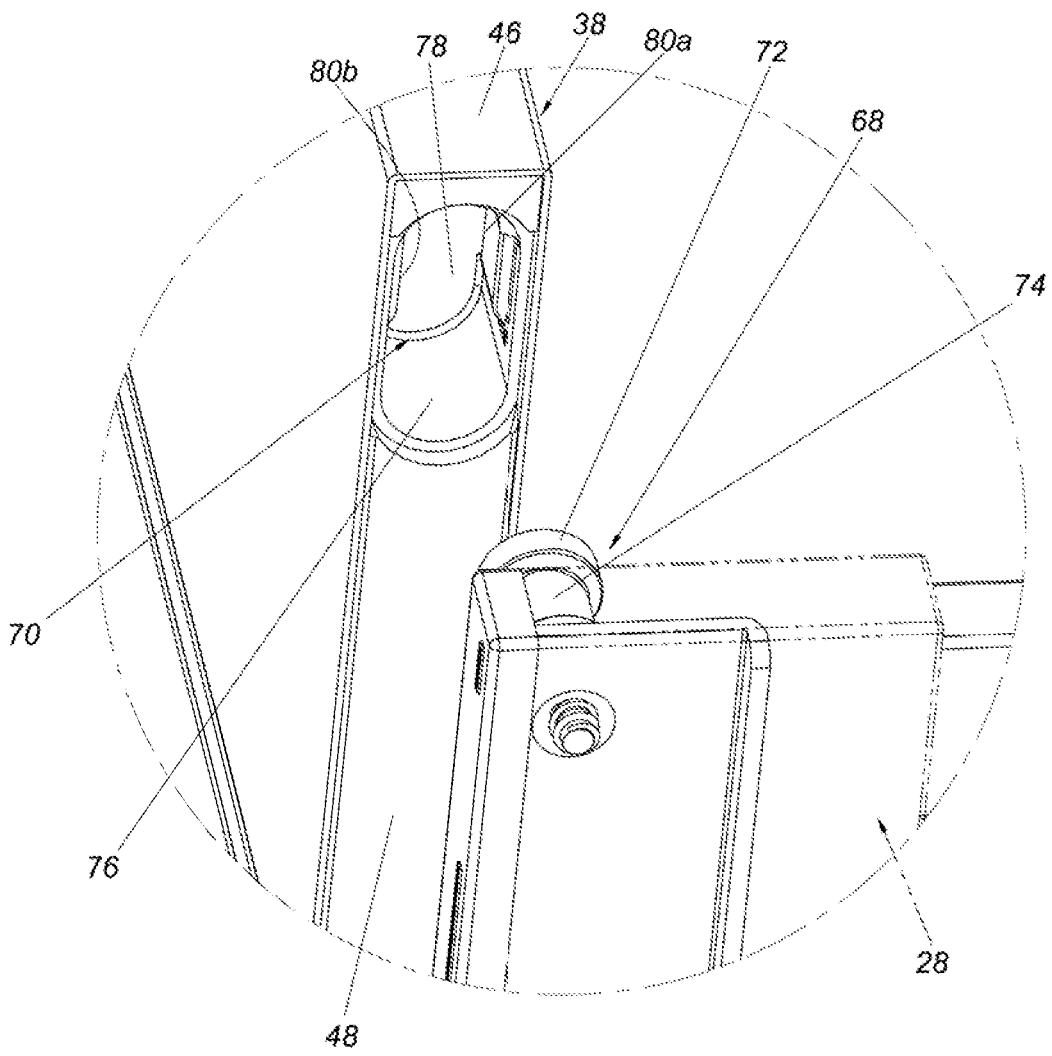
FIG. 8 is a partial exploded view that shows the first panel of the furniture and one of the fittings from a certain viewing angle.

Referring to FIG. 8, the front portion 48 of the second fitting 38 is configured to connect with the first panel 28. Preferably, one of the first panel 28 and the front portion 48 of the second fitting 38 is provided with a first connecting feature 68, and the other of the first panel 28 and the front portion 4 of the second fitting 38 is provided with a second connecting feature 70 configured to connect with the first connecting feature 68. For example, the first connecting feature 68 includes a head portion 72 and an extension portion 74, the extension portion 74 is connected to the first pane 28 at one end and is connected to the head portion 72 at the other end, the head portion 72 is larger in size than the extension portion 74, and the second connecting feature 70 includes an entrance opening 76 and a receiving room 78 in communication with the entrance opening 76, The head portion 72 is configured to enter the receiving room 78 through the entrance opening 76, engage with at least one predetermined wall (e.g., a first predetermined wall 80a and/or a second predetermined Wall 80b) in the reeving room 78, and thereby connect the second fitting 38 and the first panel 28 in a detachable manner.

Figures 9, 9A:
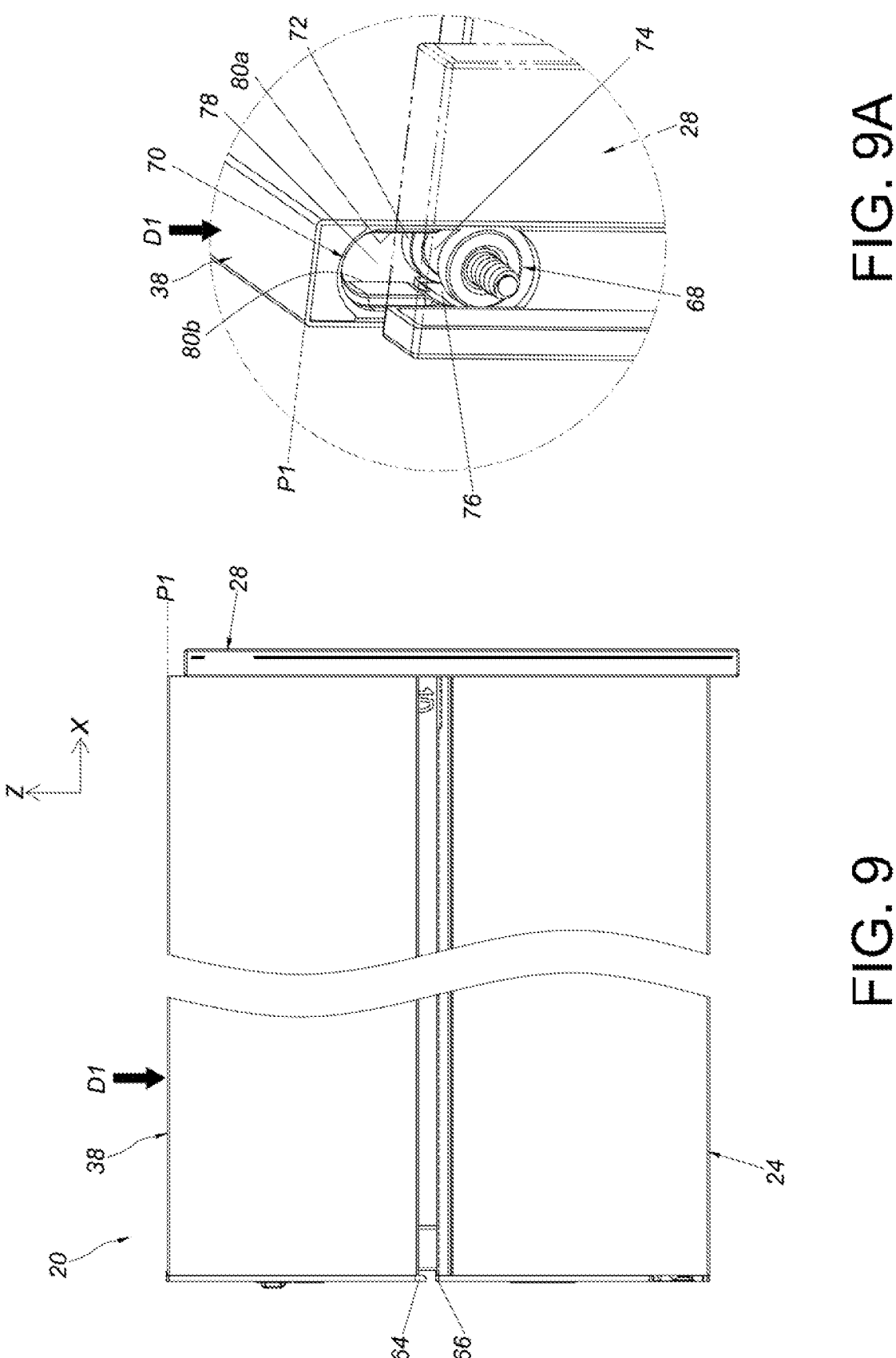
FIG. 9 is a side view showing the first step of mounting the fittings on the first panel of the furniture.
FIG. 9A is a partial front perspective view taken from another viewing angle, showing the first step of mounting the fittings on the first panel of the furniture.

Referring to FIG. 9, FIG. 9A, FIG. 10, and FIG. 10A, when the second fitting 38 is at the first predetermined position P1, the head portion 72 of the first connecting feature 68 of the first panel 28 enters the entrance opening 76 of the second connecting feature 70 of the second fitting 38 (see FIG. 9 and FIG. 9A). When the second fitting 38 reaches the second predetermined position P2 after being moved with respect to the first panel 28 from the first predetermined position P1 in the first predetermined direction D1, the head portion 72 of the first connecting feature 68 of the first panel 28 enters the receiving room 78 of the second connecting feature 70 of the second fitting 38 and engages with the at least one predetermined wall (e.g., the first predetermined wall 80a and/or the second predetermined wall 80b) in the receiving room 78 to achieve detachable connection between the second fitting 38 and the first panel 28 (see FIG. 10 and FIG. 10A). The engagement between the head portion 72 and the at least one predetermined wall (e.g., the first predetermined wall 80a and/or the second predetermined wall 80b) in the receiving room 78 can, for example, prevent the second fitting 38 and the first panel 28 from separating from each other in the length direction X of the furniture 20.

Figure 11:
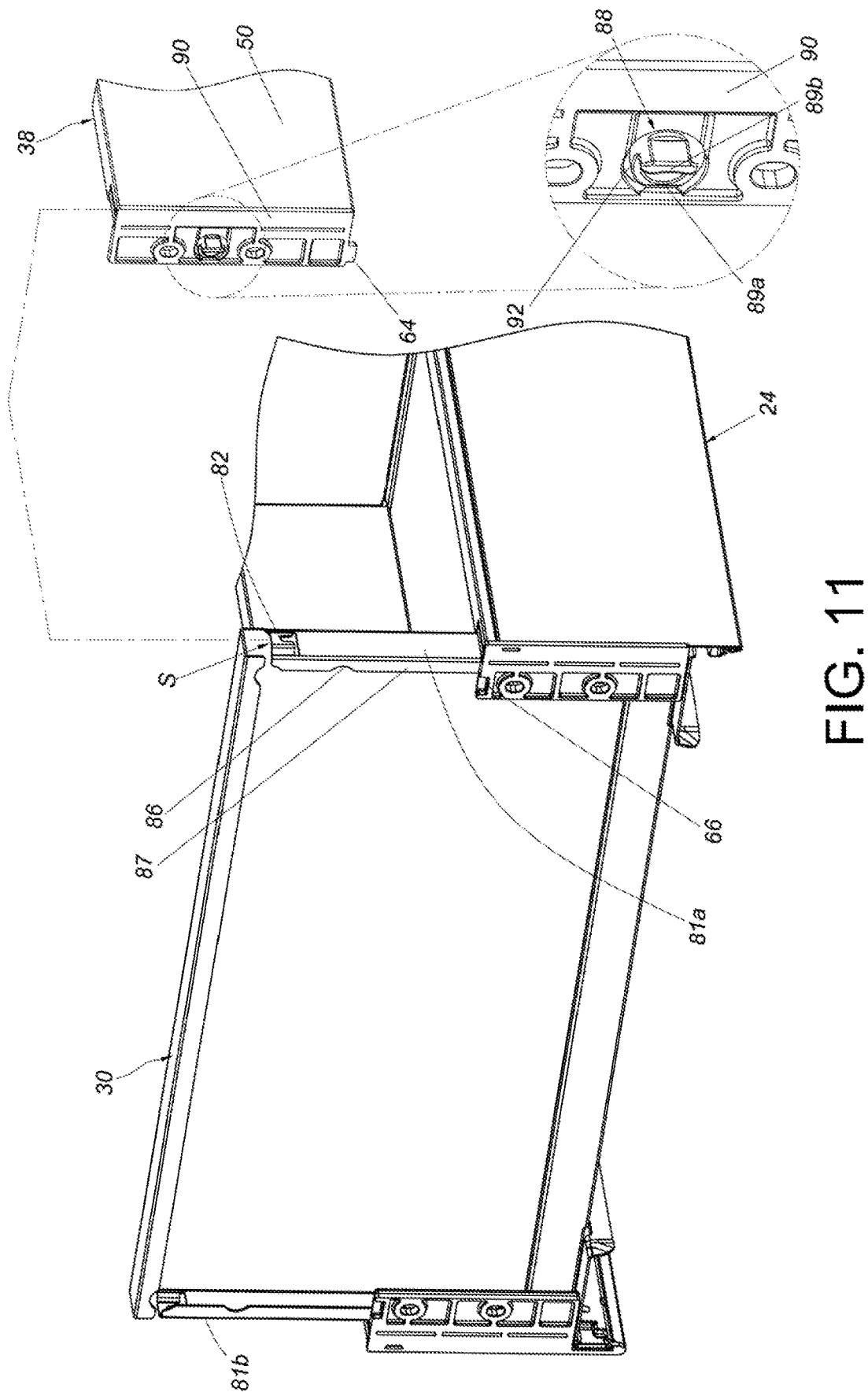
FIG. 11 is a partial exploded view that shows the second panel f the furniture and one of the fittings from a first viewing angle.
Figure 12:
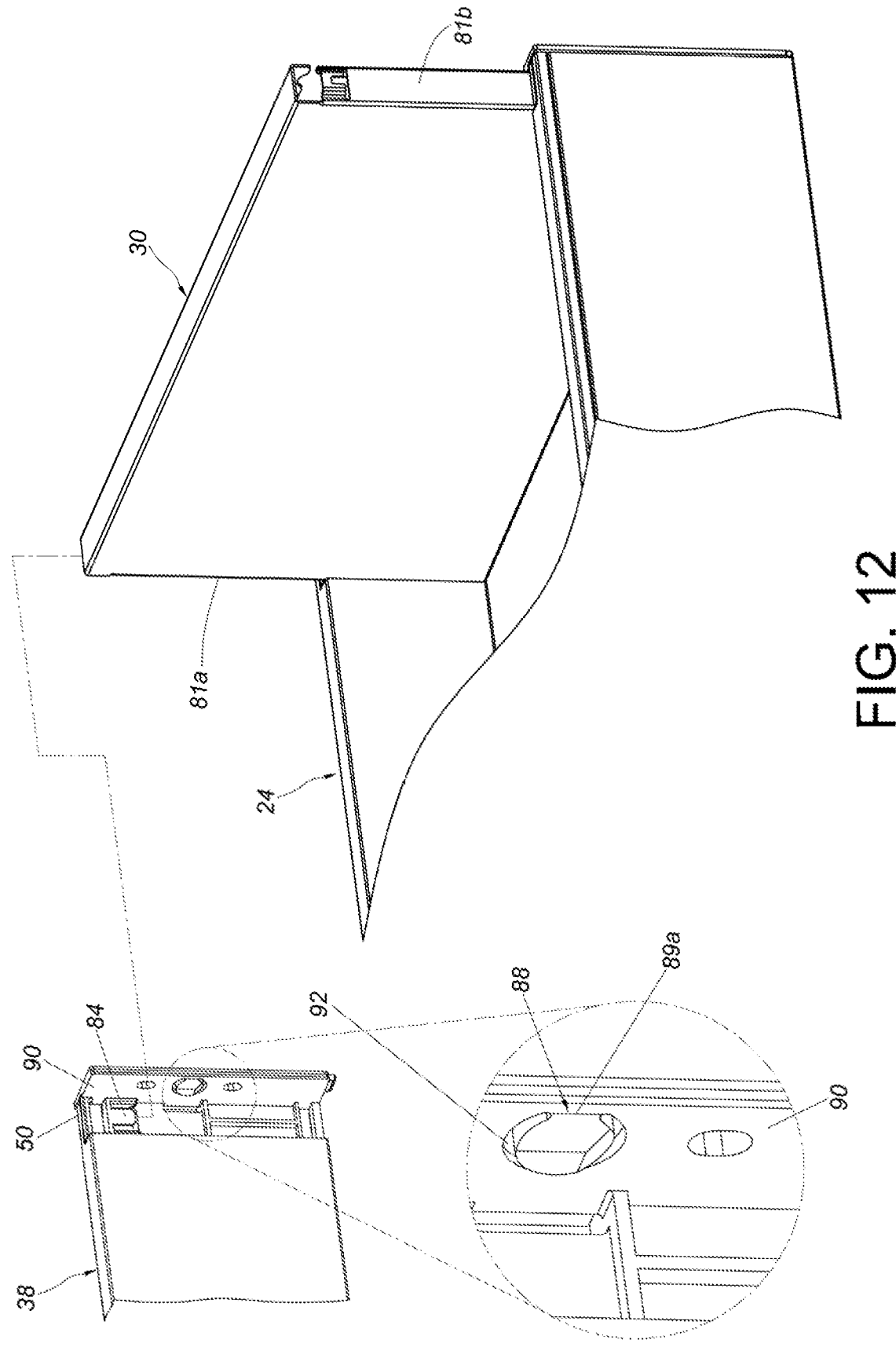
FIG. 12 is a partial exploded view that shows the second panel of the furniture and the fitting from a second viewing angle.

Referring to FIG. 11 and FIG. 12, the rear portion 50 of the second fitting 38 is configured to connect with the second panel 30. Preferably, the second panel 30 has two opposite lateral sides 81a and 81b, and each of the two lateral sides 81a and 81b is provided with a first engaging structure 82 (only the lateral side 81a is described below by way of example) (see FIG. 1I). Preferably, a second engaging structure 84 (see FIG. 12) is provided adjacent to the rear portion 50 of the second fitting 38 and is configured to detachably engage with the first engaging structure 82 of the lateral side 81a and thereby connect the second fitting 38 and the second panel 30 in a detachable manner.

Preferably, one of the first engaging structure 82 and the second engaging structure 84 is a projection that defines a mounting space S (see FIG. 11), and the other of the first engaging structure 82 and the second engaging structure 84 is an extension member configured to be mounted (e.g., inserted) in the mounting space S such that the extension member and the projection are supported by or abut against each other. Here, by way of example, the first engaging structure 82 is a projection and defines the mounting space S, and the second engaging structure 84 is the extension member.

Preferably, one of the second panel 30 and the second fitting 38 is provided with an engaging portion 86 (see FIG. 1I), and the other of the second panel 30 and the second fitting 38 is provided with a release portion 88 (see FIG. 11 and FIG. 12) configured to connect with the engaging portion 86 in a releasable manner. Here, by way of example, the second panel 30 is provided with the engaging portion 86, and the second fitting 38 is provided with the release portion 88. The second panel further includes a bent section 87 that is bent with respect to the lateral side 81a. For example, the bent section 87 is perpendicularly connected to the lateral side 81a, and the engaging portion 86 is located at the bent section 87.

Preferably, the engaging portion 86 is, for example, a stop wall, and the stop wall has, for example but not limited to, a generally C-shaped or curved contour. Preferably, the rear portion 50 of the second fitting 38 is provided with an auxiliary connecting member 90, the auxiliary connecting member 90 is bent with respect to the rear portion 50 of the second fitting 38 or is perpendicularly connected to the rear portion 50 of the second fitting 38, and the release portion 88 is, for example but not limited to, an elastic portion provided on the auxiliary connecting member 90.

Preferably, the release portion 88 includes an elastic section 89a connected to the auxiliary connecting member 90 and an operation section 89b located on the elastic section 89a. The operation section 89b is, for example, a projection or a protruding block. The auxiliary connecting member 90 has an engaging space 92 extending along the periphery of the release portion 88 and matching the generally C-shaped or curved contour of the engaging portion 86 (stop wall).

Figure 13:
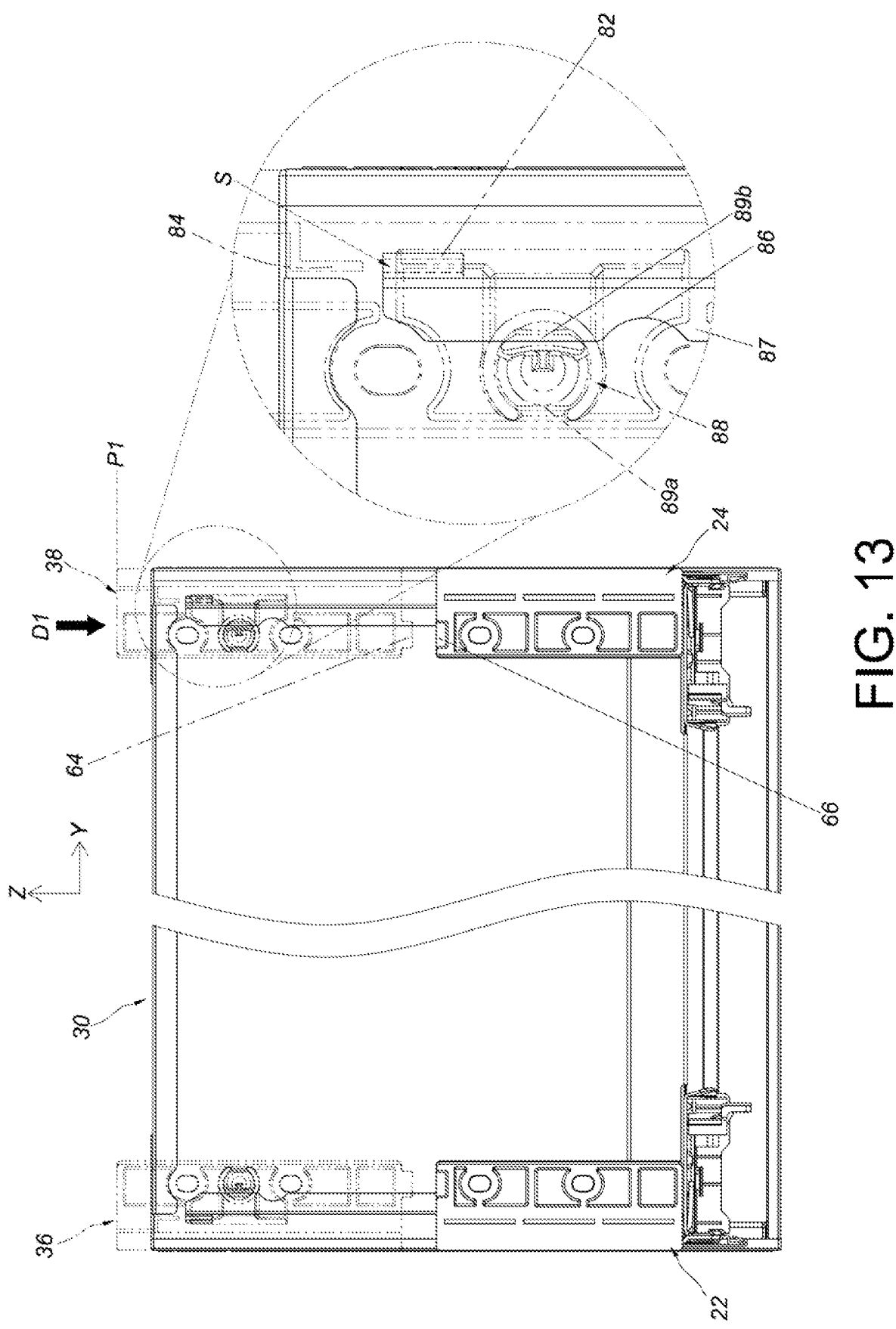
FIG. 13 is a rear view showing the first step of mounting the fittings on the second panel of the furniture.
Figure 13A:
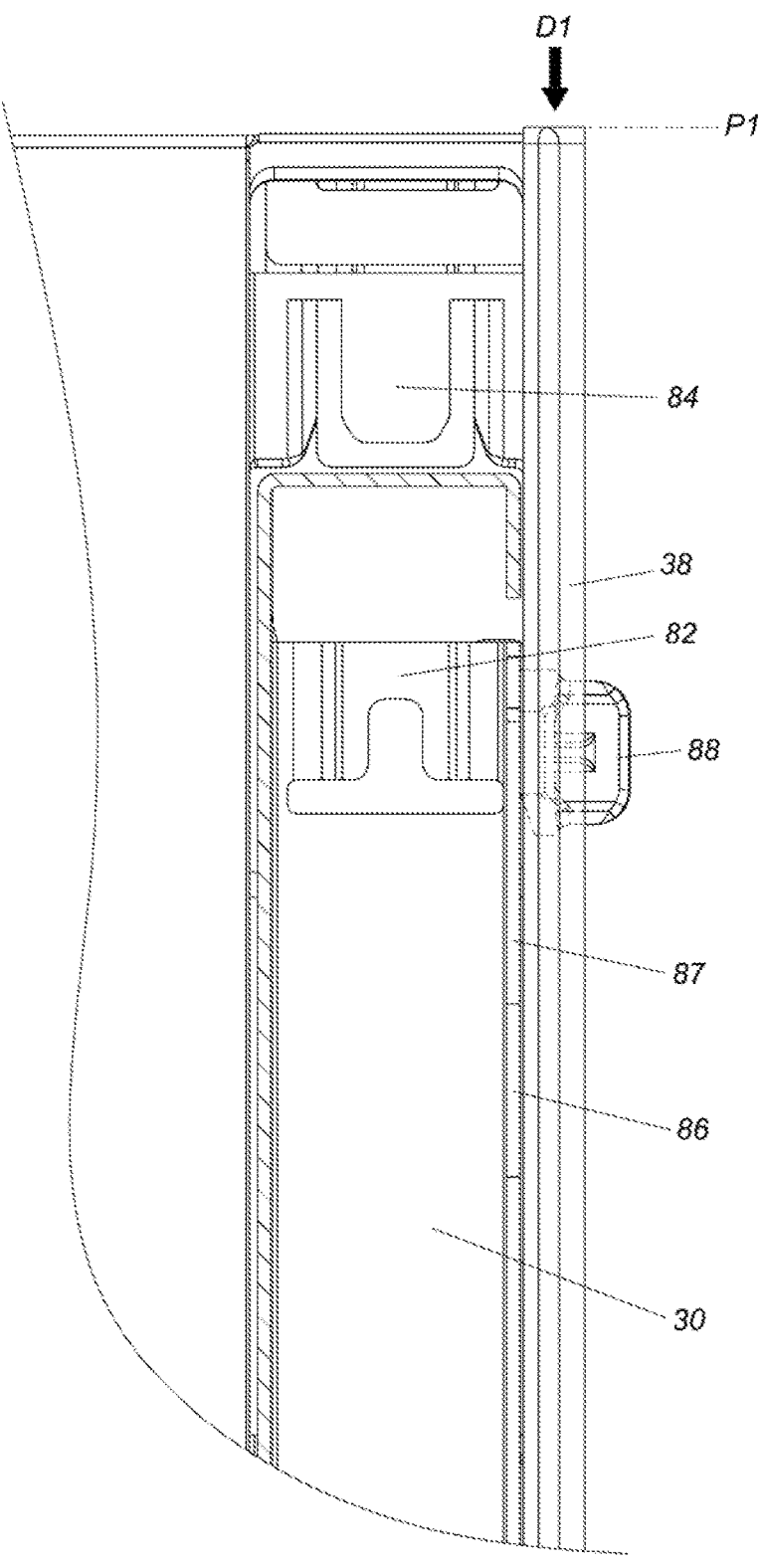
FIG. 13A is a partial side view showing the first step of mounting the fittings on the second panel of the furniture.
Figure 14:
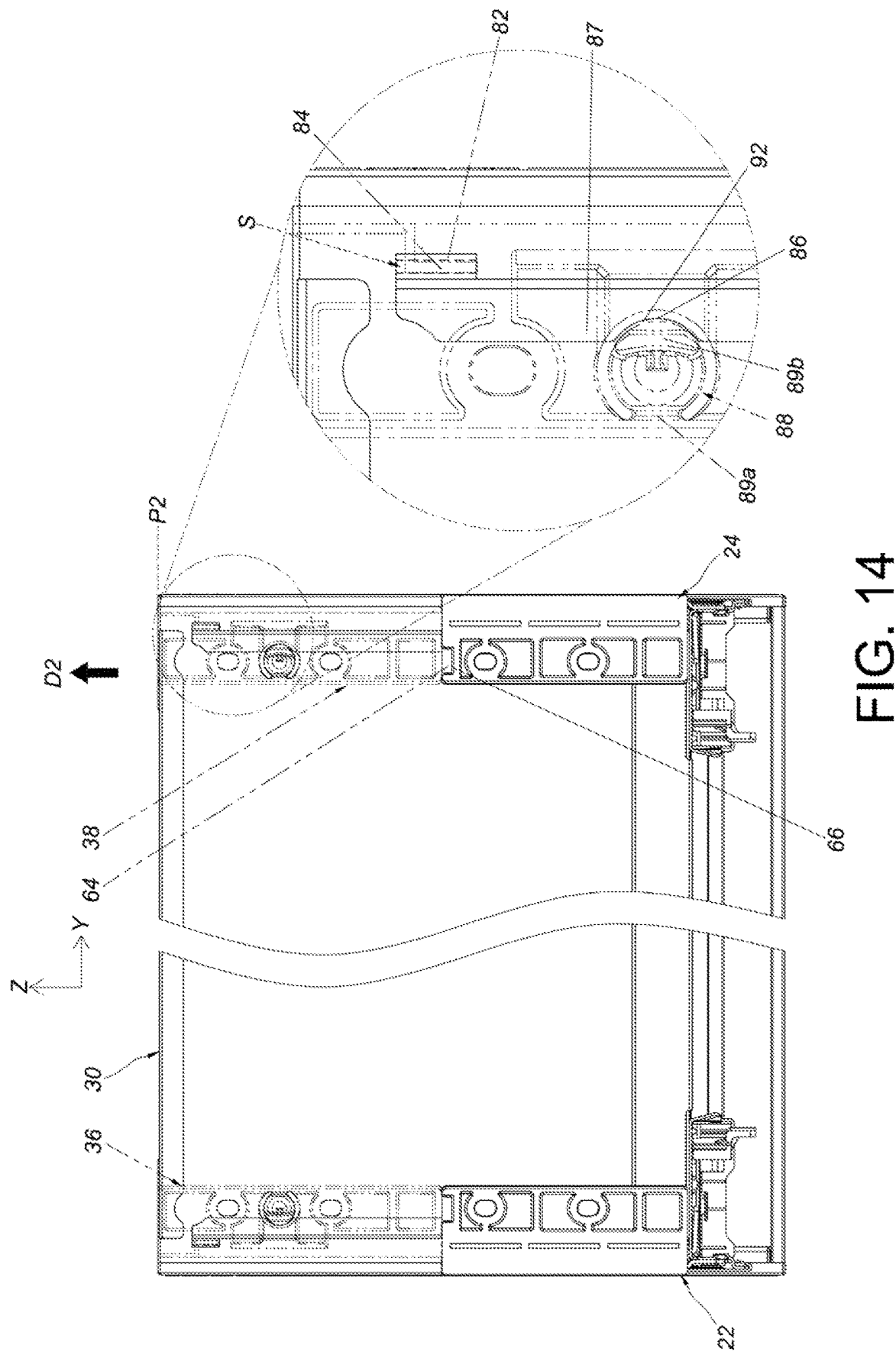
FIG. 14 is a rear view showing the second step of mounting the fittings on the second panel of the furniture.

Referring to FIG. 13, FIG. 13A, FIG. 14, FIG. 14A, and FIG. 15, when the second fitting 38 reaches the second predetermined position P2 (see FIG. 14) after being moved with respect to the second panel 30 from the first predetermined position P1 (see FIG. 13) in the first predetermined direction D1, the second engaging structure 84 of the second fitting 38 is mounted to the first engaging structure 82 of the second panel 30 such that the second engaging structure 84 and the first engaging structure 82 are supported by or abut against each other (see FIG. 14). Moreover, in the course in which the second fitting 38 is moved from the first predetermined position P1 to the second predetermined position P2 in the first predetermined direction D1, the release portion 88 of the second fitting 38 contacts a wall surface of the bent section 87 of the second panel 30 and hence stores an elastic force (see. FIG. 13A), and once the second fitting 38 reaches the second predetermined position P2, the release portion 88 releases the elastic force and is thereby connected to the engaging portion 86 in a releasable manner (see FIG. 14, FIG. 14A, and FIG. 15).

Figure 14A:
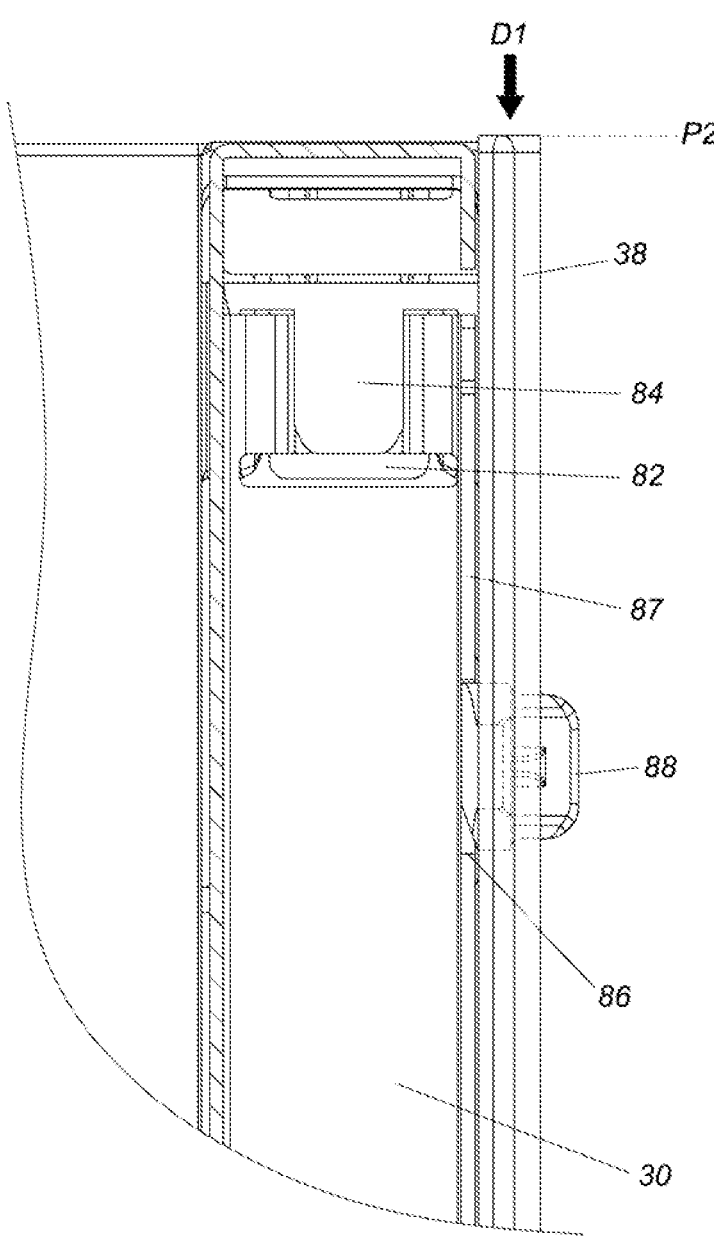
FIG. 14A is a partial side view showing the second step of mounting the fittings on the second panel of the furniture.
Figure 15:
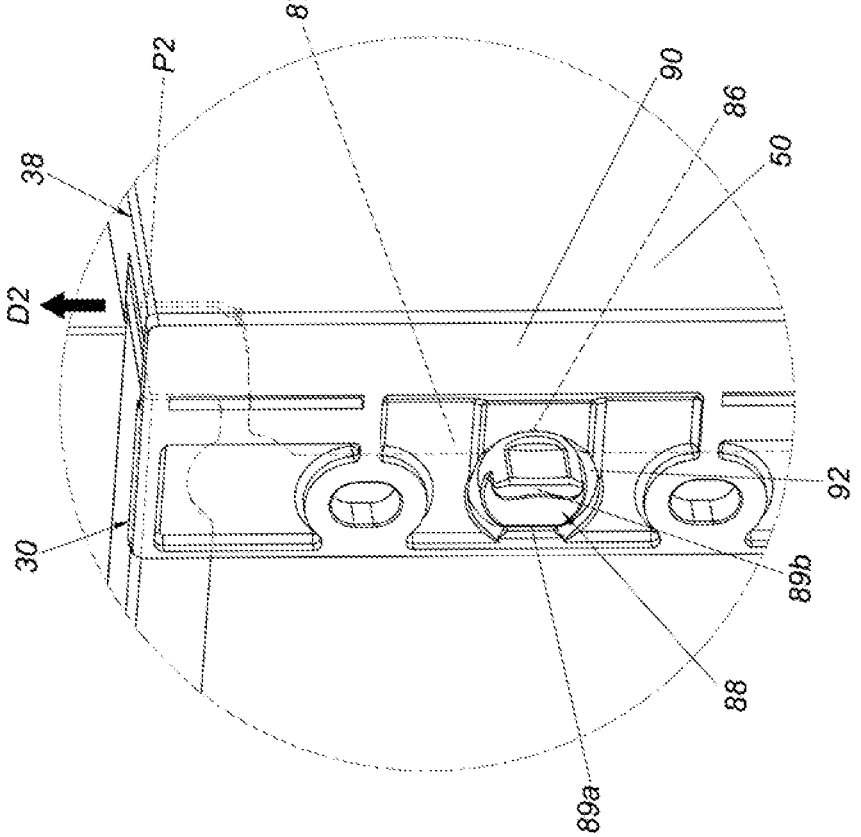
FIG. 15 shows that the fittings are mounted on the second panel of the furniture, and that the release portion has yet to be operated.

Preferably, when the release portion 88 is connected to the engaging portion 86, the engaging portion 86 corresponds to, or is located in, the engaging space 92 of the auxiliary connecting member 90 such that the release portion 88 and the engaging portion 86 enter a mutually blocking relationship to prevent the second fitting 38 from separating from the second panel 30 and/or the second sidewall 24 in the second predetermined direction D2 (see FIG. 14, FIG. 14A, and FIG. 15).

It can be known from the above that the second fitting 38 and the second sidewall 24 can be mounted to each other in a detachable manner (see FIG. 7), that the second fitting 38 and the first panel 28 can be mounted to each other in a detachable manner (see FIG. 10 and FIG. 10A), and that the second fitting 38 and the second panel 30 can be mounted to each other in a detachable manner (see FIG. 14), Based on a similar principle, the first fitting 36 and the first sidewall 22 can be mounted to each other in a detachable manner, the first fitting 36 and the first panel 28 can be mounted to each other in a detachable manner, and the first fitting 36 and the second panel 30 can be mounted to each other in a detachable manner.

Figure 16:
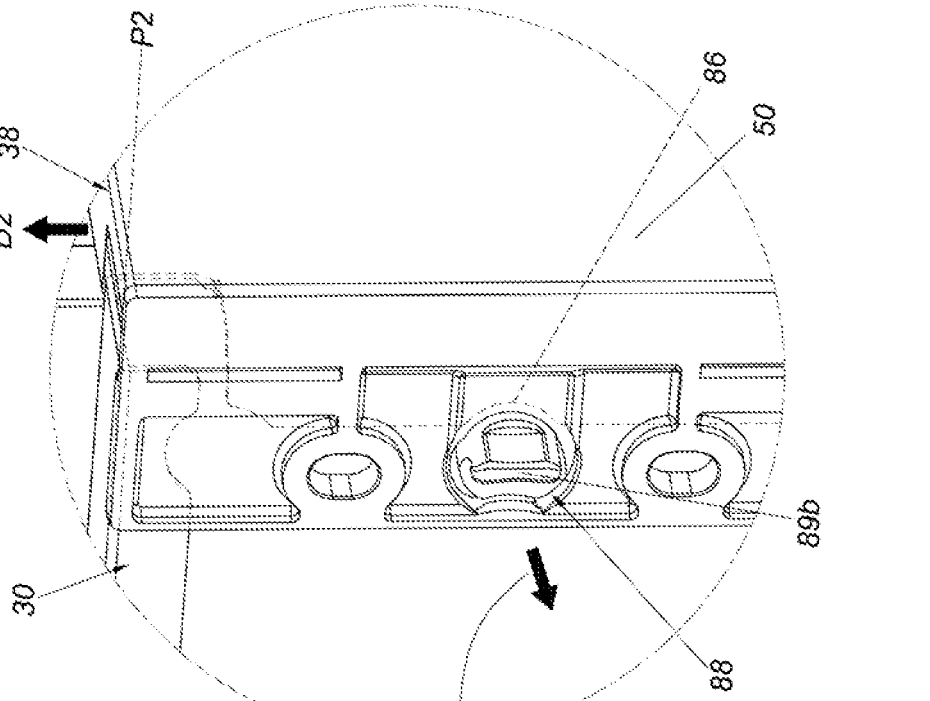
FIG. 16 shows that the fittings are mounted on the second panel of the furniture, and that the release portion has been operated.

Referring to FIG. 15 and FIG. 16, the second fitting 38 can be detached from the second panel 30, the second sidewall 24, and the first panel 28 by the following operation procedure:

First, the user applies a force F to the release portion 88 (e.g., the user drives the release portion 88 with the operation section 89*b*) to terminate the mutually blocking relationship between the release portion 88 and the engaging portion 86 (see FIG. 16), thereby allowing the second fitting 38 to separate from the second panel 30 in the second predetermined direction D2.

Figures 10, 10A:
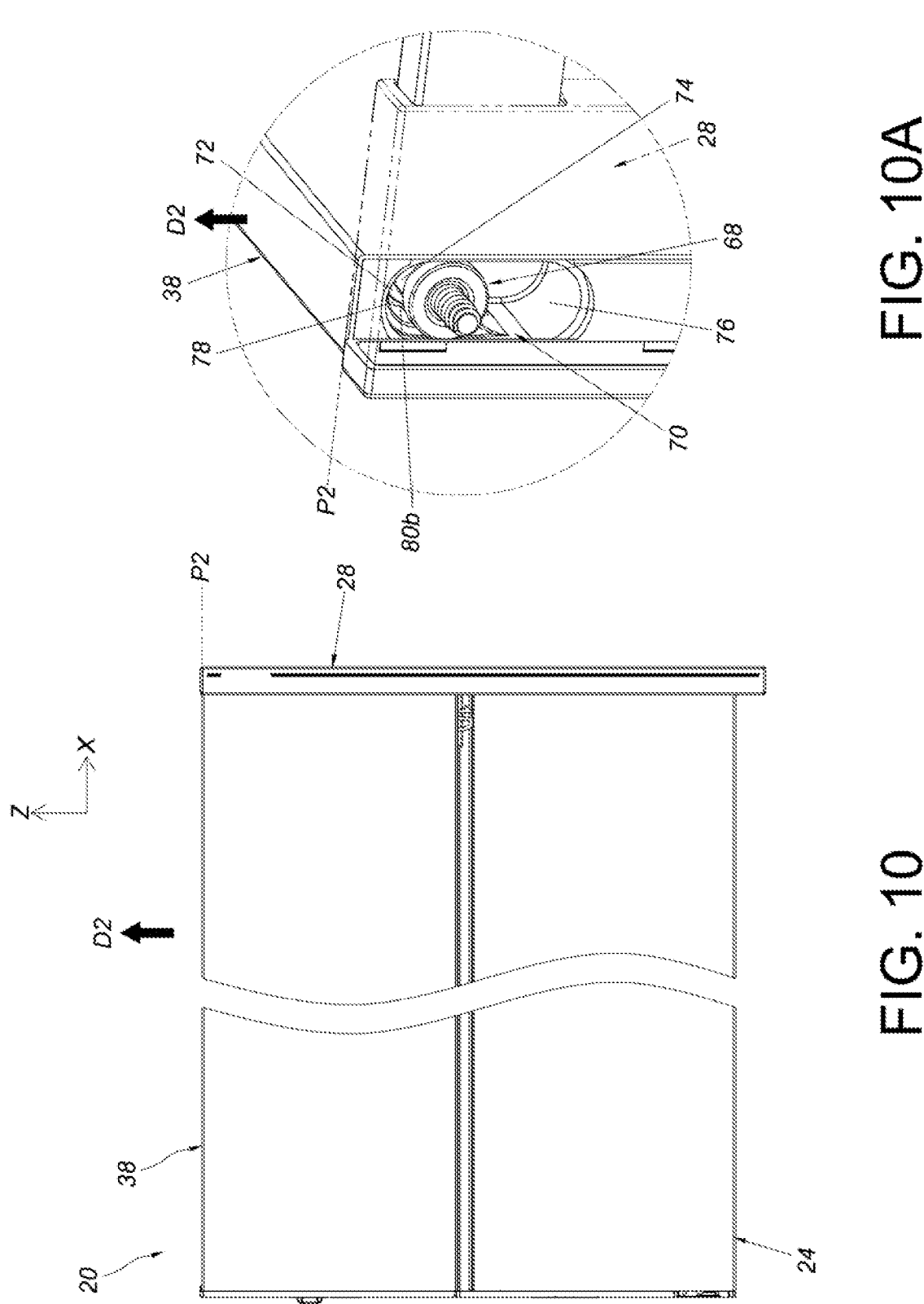
FIG. 10 is a side view showing the second step of mounting the fittings on the first panel of the furniture.
FIG. 10A is a partial front perspective view taken from another viewing angle, showing the second step of mounting the fittings on the first panel of the furniture.
Figure 17:
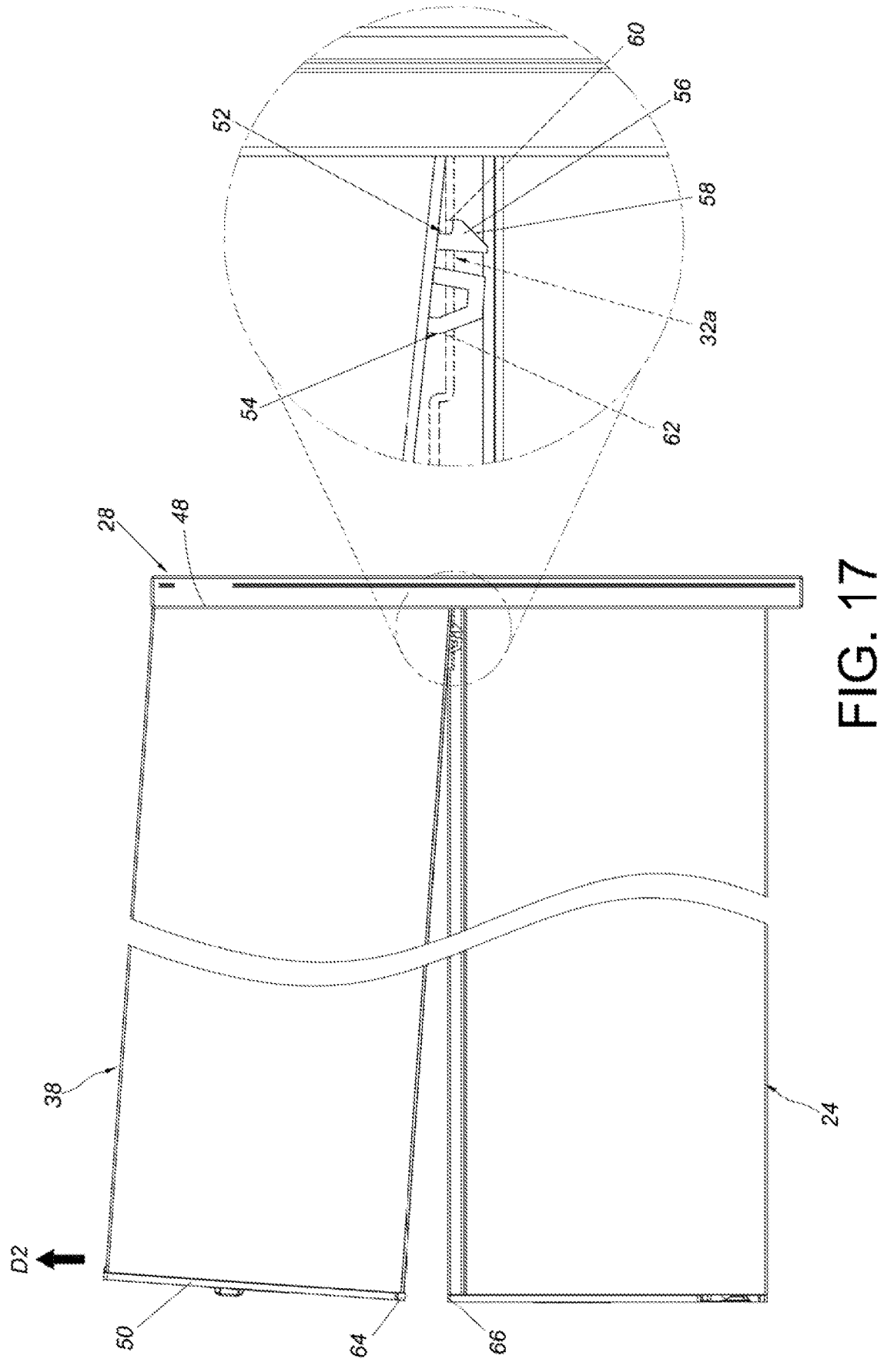
FIG. 17 shows how the fittings are detached from the sidewalls of the furniture respectively.

Once the mutually blocking relationship between the release portion 88 and the engaging portion 86 is terminated, referring to FIG. 17, the rear portion 50 of the second fitting 38 can be lifted slightly in the second predetermined direction D2 with respect to the front portion 48 of the second fitting 38 (e.g., the lift being enabled by the flexibility of the materials of or the assembly gap between, the second fitting 38 and the first panel 28) so that the engaging hook 56 of the first mounting portion 52 of the second fitting 38 is turned by an angle and therefore no longer hooked to the first inner wall 60 of the mounting feature 32*a*, As a result, the second fitting 38 is allowed to separate from the second sidewall 24 in the second predetermined direction D2 (see FIG. 17) and to separate from the first panel 28 as well (as sequentially shown in FIG. 10A, FIG. 9A, and FIG. 8).

It can be known from the above that the second fitting 38 can be detached from the second panel 30, the second sidewall 24, and the first panel 28, Based on a similar principle, and as can be understood without further explanation, the first fitting 36 can be detached from the second panel 30, the first sidewall 22, and the first panel 28.

It is worth mentioning that after the second fitting 38 is detached from the mounting feature 32*a* of the second sidewall 24, the covering member 34*a* can be mounted back on the mounting feature 32*a* in a detachable manner in order to cover the mounting feature 32*a* and thereby produce a dustproof effect. Similarly, after the first fitting 36 is detached from the mounting feature 32*b* of the first sidewall 22, the covering member 34*b* can be mounted back on the mounting feature 32*b* a detachable manner in order to cover the mounting feature 32*b* and thereby also produce a dustproof effect (see FIG. 1).

According to the above, the furniture and the furniture part assembly disclosed in the foregoing embodiment of the present invention have the following features:

1. Each covering member (34*a* or 34*b*) is detachably mounted on the mounting feature (32*a* or 32*b*) of the corresponding sidewall (24 or 22) of the furniture 20, and each covering member (34*a* or 34*b*) is configured to cover the corresponding mounting feature (32*a* or 32*b*) and thereby produce a dustproof effect.

2. When necessary, each covering member (34*a* or 34*h*) can be detached from the mounting feature (32*a* or 32*b*)

of the corresponding sidewall (24 or 22), and then each fitting (36 or 38) can be detachably mounted to the mounting feature (32*b* or 32*a*) of the corresponding sidewall (22 or 24) to add to or increase the height of the corresponding sidewall (22 or 24) of the furniture 20.

3. Each fitting (36 or 38) and the corresponding sidewall (22 or 24) can be mounted to each other in a detachable manner without using tools (see FIG. 7), each fitting (36 or 38) and the first panel 28 can be mounted to each other in a detachable manner without using tools (see FIG. 10 and FIG. 10A), and/or each fitting (36 or 38) and the second panel 30 can be mounted to each other in a detachable manner without using tools (see FIG. 14).

While the present invention has been disclosed with reference to the preferred embodiment described above, it is understood that the embodiment is not intended to be restrictive of the scope of the invention. The scope of the patent protection sought by the applicant is defined by the appended claims.

What is claimed is:

1. A furniture part assembly, comprising:
a sidewall defining a height direction and being formed with a mounting feature, wherein the mounting feature is an aperture formed with a first inner wall and a second inner wall;
a covering member detachably mountable to the mounting feature; and
a fitting defining a height direction and being detachably mounted to the mounting feature, the fitting including a first mounting portion and a second mounting portion and being stacked on the sidewall in the height directions of the sidewall and the fitting for selectively increasing a height of the sidewall when the covering member is detached from the mounting feature, wherein a physical gap is formed between the first and second mounting portions;
wherein the covering member is mounted on the mounting feature for covering the mounting feature of the sidewall when the fitting is detached from the mounting feature;
wherein the first and second mounting portions of the fitting are, respectively, mounted on the first and second inner walls of the aperture when the covering member is detached from the mounting feature; and
wherein with respect to the first and second mounting portions, only the first mounting portion includes an engaging hook for hooking onto the first inner wall of the aperture.

2. The furniture part assembly of claim 1, wherein the fitting has a front portion, and the first and second mounting portions are located adjacent to the front portion of the fitting.

3. The furniture part assembly of claim 1, wherein the fitting has a rear portion, and a first supporting feature is formed adjacent to the rear portion of the fitting, and a second supporting feature is formed at a section of the sidewall corresponding in position to the first supporting feature for supporting and being supported by the first supporting feature.

4. A furniture part assembly, comprising:
a sidewall including a bottom portion and a top portion and defining a height direction therebetween, the top portion having a first predetermined height with respect to the bottom portion, and the top portion being provided with a mounting feature, wherein the mounting feature is an aperture being formed with a first inner wall and a second inner wall;

a covering member detachably mountable to the mounting feature; and a fitting including a bottom portion and a top portion and defining a height direction therebetween, and the bottom portion of the fitting including a first mounting portion and a second mounting portion;

wherein the bottom portion of the fitting is mounted to the mounting feature of the sidewall when the covering member is detached from the mounting feature, thereby the fitting being stacked on the sidewall in the height directions of the sidewall and the fitting for selectively increasing a height of the sidewall, wherein the first and second mounting portions are two separate mechanical components and wherein a physical gap is formed therebetween, and the fitting, further, including a front portion and a rear portion, and the top portion of the fitting having a second predetermined height with respect to the bottom portion of the sidewall, wherein the second predetermined height is greater than the first predetermined height;

wherein the first and second mounting portions are, respectively, mounted on the first and second inner walls of the aperture when the covering member is detached from the mounting feature;

wherein with respect to the first and second mounting portions, only the first mounting portion includes an engaging hook for hooking onto the first inner wall of the aperture; and wherein with respect to the front portion of the fitting, the first mounting portion is positioned closer thereto relative to the second mounting portion, and wherein with respect to the rear portion of the fitting, the second mounting portion is positioned closer thereto relative to the first mounting portion.

5. The furniture part assembly of claim 1, wherein the first mounting portion and the second mounting portion are located adjacent to the front portion of the fitting.

6. The furniture part assembly of claim 5, further comprising a first panel, wherein a first connecting feature is formed on one of the first panel and the front portion of the fitting, and a second connecting feature is formed on the other of the first panel and the front portion of the fitting for connecting with the first connecting feature.

7. The furniture part assembly of claim 6, wherein the first connecting feature includes a head portion and an extension portion connected to the head portion and the second connecting feature includes an entrance opening and a receiving room in communication with the entrance opening, and wherein the head portion enters the receiving room through the entrance opening to engage with a predetermined wall in the receiving room for thereby detachably connecting the fitting and the first panel.

8. The furniture part assembly of claim 1, wherein a first supporting feature is formed adjacent to the rear portion of the fitting and a second supporting feature is formed at a section of the sidewall corresponding in position to the first supporting feature for supporting and being supported by the first supporting feature.

9. The furniture part assembly of claim 8, further comprising a second panel, wherein the second panel is formed with a first engaging structure and a second engaging structure is formed adjacent to the rear portion of the fitting to engage with the first engaging structure and thereby detachably connect the fitting and the second panel.

10. The furniture part assembly of claim 9, wherein one of the second panel and the fitting is formed with an engaging portion and the other of the second panel and the fitting is formed with a release portion to releasably connect with the engaging portion.

11. A piece of furniture, comprising:

a bottom panel;

a first sidewall and a second sidewall located, respectively, on a left side and a right side of the bottom panel, each of the first sidewall and the second sidewall defining a height direction; and a first panel and a second panel located, respectively, on a front side and a rear side of the bottom panel;

wherein a mounting feature is formed on at least one of the first sidewall and the second sidewall, the mounting feature of a corresponding one of the first sidewall and the second sidewall being an aperture formed with a first inner wall and a second inner wall, and a covering member is detachably mountable to the mounting feature of a corresponding one of the first sidewall and the second sidewall;

wherein at least one of the first sidewall and the second sidewall is detachably mountable with a fitting via the mounting feature of a corresponding one of the first sidewall and the second sidewall when the corresponding covering member is detached from the respective mounting feature, the fitting defining a height direction and including a first mounting portion and a second mounting portion and being stacked on a corresponding one of the first sidewall and the second sidewall in the height directions of the respective first sidewall and second sidewall and the fitting for selectively increasing a height of the respective first sidewall and second sidewall when the covering member is detached from the mounting feature of the respective first sidewall and second sidewall, wherein a physical gap is formed between the first and second mounting portions;

wherein the first and second mounting portions of the fitting are, respectively, mounted on the first and second inner walls of the aperture of a corresponding one of the first sidewall and the second sidewall when the covering member is detached from the mounting feature of the respective first sidewall and second sidewall; and wherein with respect to the first and second mounting portions, only the first mounting portion includes an engaging hook for hooking onto the first inner wall of the aperture of a corresponding one of the first sidewall and the second sidewall.

12. The piece of furniture of claim 11, wherein the fitting has a front portion, and wherein one of the first panel and the front portion of the fitting is formed with a first connecting feature and the other of the first panel and the front portion of the fitting is formed with a second connecting feature for connecting with the first connecting feature; wherein the first connecting feature includes a head portion and an extension portion connected to the head portion and the second connecting feature includes an entrance opening and a receiving room in communication with the entrance opening, and wherein the head portion enters the receiving room through the entrance opening to engage with a predetermined wall in the receiving room for thereby detachably connecting the fitting and the first panel.

13. The piece of furniture of claim 11, wherein the fitting has a rear portion, and wherein the second panel is formed with a first engaging structure and a second engaging structure is formed adjacent to the rear portion of the fitting to engage with the first engaging structure and thereby detachably connect the fitting and the second panel.

14. The piece of furniture of claim 13, wherein the second panel is further formed with an engaging portion and the fitting is further formed with a release portion for releasably connecting with the engaging portion.

\* \* \* \* \*